(12) United States Patent
Miyao

(10) Patent No.: US 12,174,481 B2
(45) Date of Patent: Dec. 24, 2024

(54) DISPLAY DEVICE COMPRISING A PARTITION SECTION HAVING A PLURALITY OF STRUCTURES ARRANGED AT INTERVALS AND A DIFFRACTION SECTION CONFIGURED TO DIFFRACT A PLURALITY OF LIGHTS

(71) Applicant: Japan Display Inc., Tokyo (JP)

(72) Inventor: Makoto Miyao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/528,857

(22) Filed: Dec. 5, 2023

(65) Prior Publication Data

US 2024/0192539 A1 Jun. 13, 2024

(30) Foreign Application Priority Data

Dec. 7, 2022 (JP) ................. 2022-195288

(51) Int. Cl.
  *G02F 1/1335* (2006.01)
  *G02F 1/13357* (2006.01)
  *G02F 1/1347* (2006.01)
  *G02F 1/135* (2006.01)
  *G02F 1/1362* (2006.01)

(52) U.S. Cl.
  CPC .. *G02F 1/133504* (2013.01); *G02F 1/133615* (2013.01); *G02F 1/13471* (2013.01); *G02F 1/1351* (2021.01); *G02F 1/136286* (2013.01); *G02F 1/133512* (2013.01)

(58) Field of Classification Search
  CPC ................................................. G02F 1/1351
  See application file for complete search history.

(56) References Cited

U.S. PATENT DOCUMENTS

| 2012/0249940 | A1* | 10/2012 | Choi | ................. G02F 1/134309 349/123 |
| 2018/0113250 | A1* | 4/2018 | Lee | ................... G02F 1/133528 |
| 2020/0310175 | A1 | 10/2020 | Okuyama et al. | |
| 2021/0088817 | A1 | 3/2021 | Takahashi et al. | |

FOREIGN PATENT DOCUMENTS

| CN | 108050439 A | * | 5/2018 | ................ F21S 8/00 |
| CN | 114114506 A | * | 3/2022 | |
| JP | 2019-211666 A | | 12/2019 | |
| JP | 2020-160322 A | | 10/2020 | |

* cited by examiner

*Primary Examiner* — Paul C Lee

(74) *Attorney, Agent, or Firm* — Michael Best & Friedrich LLP

(57) ABSTRACT

A display panel includes a light source section, a light guide section, a liquid crystal layer, a partition section, a display section, and a diffraction section. The light source section emits plural lights of different colors. The light emitted from the light source section enters the light guide section. The light that has passed through the light guide section enters the liquid crystal layer. The partition section partitions the liquid crystal layer into plural pixel regions. The partition section includes plural scanning lines and plural black matrices arranged at intervals in an intersecting direction that intersects with a thickness direction of the light guide section. An image formed by the light emitted from the plural pixel regions is displayed on the display section. The diffraction section diffracts the plural lights that have entered the light guide section from the light source section.

6 Claims, 12 Drawing Sheets

DISPLAY DEVICE COMPRISING A PARTITION SECTION HAVING A PLURALITY OF STRUCTURES ARRANGED AT INTERVALS AND A DIFFRACTION SECTION CONFIGURED TO DIFFRACT A PLURALITY OF LIGHTS

CROSS REFERENCES TO RELATED APPLICATIONS

The present application claims priority to Japanese Patent Application No. 2022-195288 filed on Dec. 7, 2022, the disclosure of which is incorporated herein by reference.

TECHNICAL FIELD OF THE INVENTION

The present invention relates to a display device using a liquid crystal layer.

BACKGROUND OF THE INVENTION

As a display device using a liquid crystal layer, there is a display device in which one of the substrates sandwiching a liquid crystal layer has a low refractive index region (see Japanese Unexamined Patent Application Publication No. 2020-160322 (Patent Document 1)). Also, there is a device in which a reflection layer is provided between a first transparent substrate and a second transparent substrate (see Japanese Unexamined Patent Application Publication No. 2019-211666 (Patent Document 2)).

SUMMARY OF THE INVENTION

The inventor of this application has been developing a transparent display device with which an observer can recognize a display image and a background superimposed on each other. When an image is displayed on a display section of a transparent display device, a plurality of lights of different colors enter a light guide section from a light source section.

Studies by the inventor of this application have revealed that when a plurality of lights of different colors are made to enter a light guide section from a light source section, color unevenness appears in a part of a display region close to the light source section.

An object of the present invention is to provide a technique capable of improving the performance of a display device.

A display device which is an aspect of the present invention includes: a light source section capable of emitting a plurality of lights of different colors; a light guide section which the light emitted from the light source section enters; a liquid crystal layer which the light that has passed through the light guide section enters; a partition section configured to partition the liquid crystal layer into a plurality of pixel regions and including a plurality of structures arranged at intervals in an intersecting direction that intersects with a thickness direction of the light guide section; a display section on which an image formed by light emitted from the plurality of pixel regions is displayed; and a diffraction section configured to diffract the plurality of lights that have entered the light guide section from the light source section.

BRIEF DESCRIPTIONS OF THE DRAWINGS

DESCRIPTIONS OF THE PREFERRED EMBODIMENTS

Figure 1:
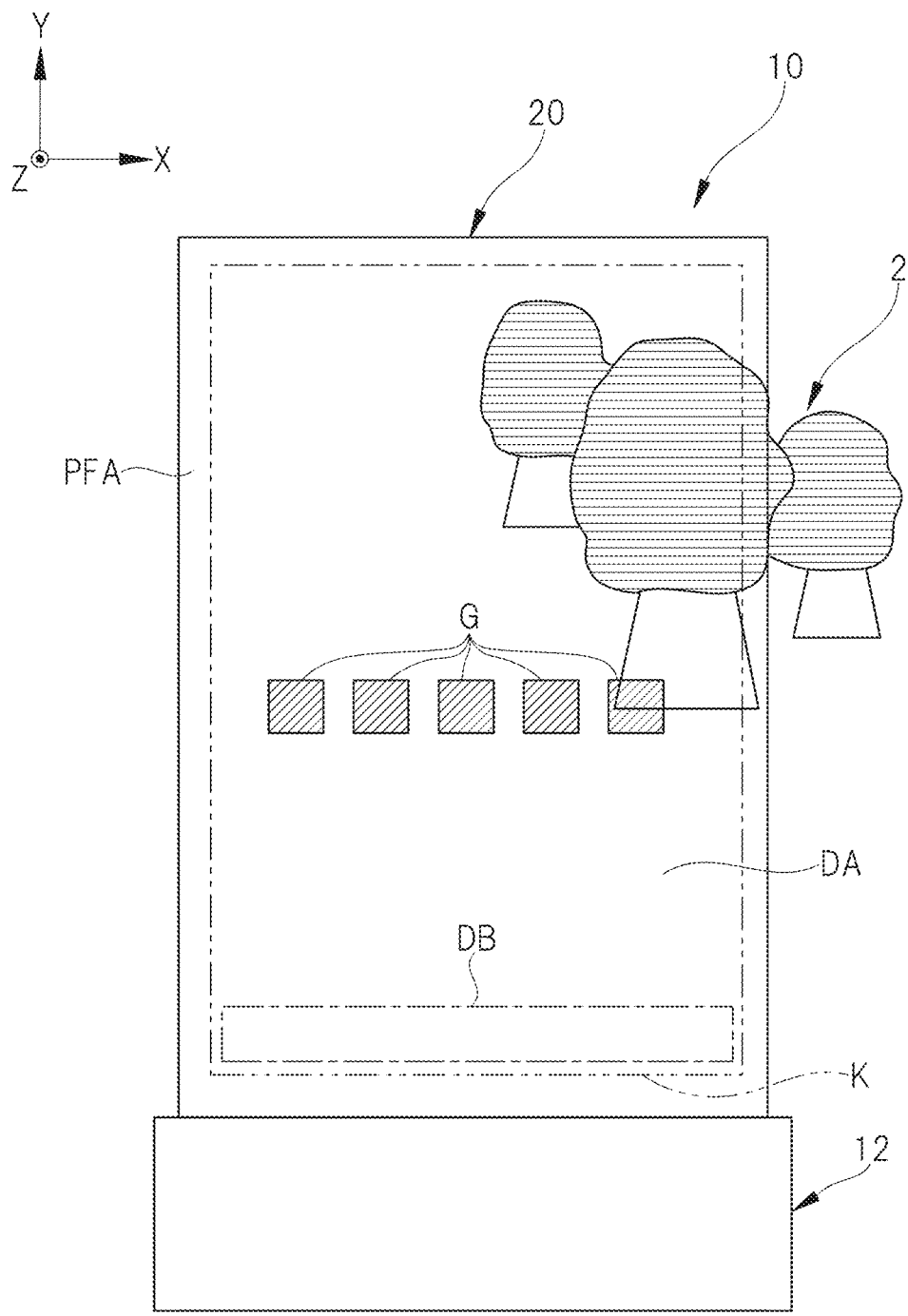
FIG. 1 is an explanatory diagram showing an example of a background and an image visually recognized through a display panel of a display unit according to the first embodiment.

Hereinafter, each embodiment of the present invention will be described with reference to drawings. Note that the disclosure is mere an example, and it is a matter of course that any alteration that is easily made by a person skilled in the art while keeping a gist of the present invention is included in the scope of the present invention. In addition, the drawings schematically illustrate a width, a thickness, a shape, and the like of each portion as compared with actual aspects in order to make the description clearer, but the drawings are mere examples and do not limit the interpretation of the present invention. Further, the same elements as those described in relation to the foregoing drawings are denoted by the same or related reference characters in this specification and the respective drawings, and detailed descriptions thereof will be omitted as appropriate.

Configuration of First Embodiment

Figure 4:
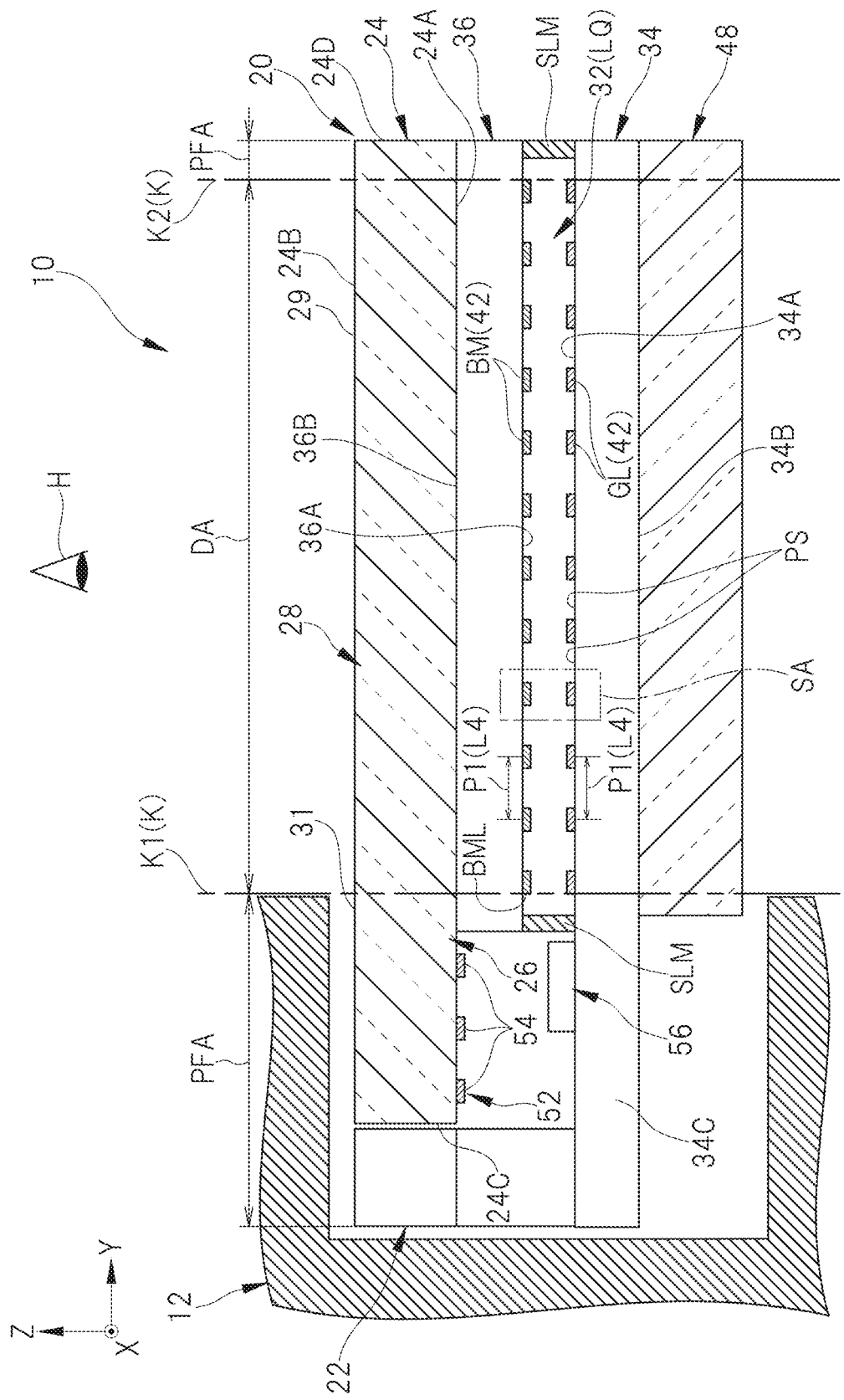
FIG. 4 is a cross-sectional view taken along the line A-A in FIG. 3.

As shown in FIG. 1, a display unit 10 according to the first embodiment includes a cover section 12 and a display panel 20. The cover section 12 is configured to cover portions of the display panel 20 except a display section 28 (FIG. 4). Note that the display unit 10 and the display panel 20 are each an example of a display device.

<Display Panel>

The display panel 20 is configured to display an image by using scattering of visible light by liquid crystal molecules. In FIG. 1, an image G composed of a plurality of rectangles is shown as an example of the image. Note that, in the following description, the direction along the thickness direction of the display panel 20 is defined as the Z direction. The Z direction is also an example of a thickness direction of a light guide section 26 described later. Further, in the X-Y plane perpendicular to the Z direction, the direction in which one side of the display panel 20 extends is defined as the X direction, and the direction perpendicular to the X direction and the Z direction is defined as the Y direction. The Y direction is an example of an intersecting direction that intersects with the Z direction. The X direction is an example of a width direction that is perpendicular to (intersects with) each of the Z direction and the Y direction. For example, the length of the display panel 20 in the Y direction is longer than the length in the X direction. When the display panel 20 is viewed from one side to the other side in the Z direction, a background 2 is visually recognized through the display panel 20.

When the display panel 20 is viewed from one side to the other side in the Z direction, the region where the image G can be displayed is defined as a display region DA. Further, the region outside the display region DA is defined as a peripheral region PFA. The display region DA and the peripheral region PFA are delimited by a boundary K indicated by a virtual line. Basically, the boundary K is not visually recognized regardless of the state of use of the display panel 20.

In the display region DA, for example, the image G is formed in accordance with an input signal supplied from the outside. Specifically, the image G is formed by lights LR, LG, and LB (FIG. 8) emitted from a plurality of pixel regions PS (FIG. 2) described later. Here, when both the display region DA and the peripheral region PFA transmit light, the entire background 2 can be visually recognized without any discomfort. Note that a region that is a part of the display region DA and is located closest to a light source section 22 (FIG. 2) described later is defined as a light entrance region DB.

When the peripheral region PFA has a light blocking property that does not allow light to pass through, a part of the background 2 that is visually recognized through the display panel 20 is shielded by the peripheral region PFA, so that the viewer may feel uncomfortable. Therefore, in the case of the display panel 20 which is a transparent display panel, it is preferable that each of the display region DA and the peripheral region PFA has visible light transmittance. Furthermore, from the viewpoint of visually recognizing the background 2 without causing any discomfort, it is particularly preferable that the display region DA and the peripheral region PFA have the same degree of visible light transmittance.

Figure 2:
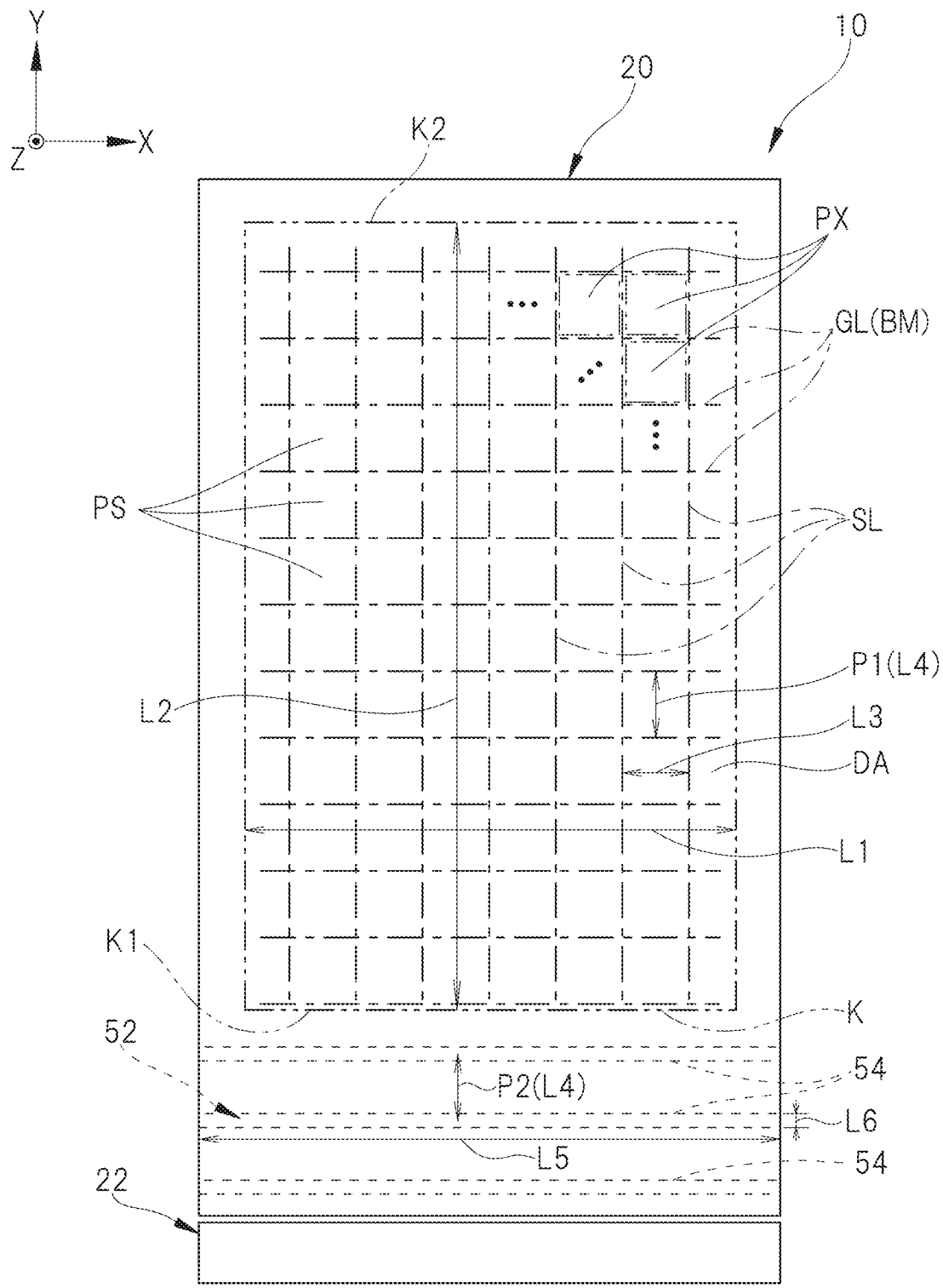
FIG. 2 is a plan view of the display panel shown in FIG. 1.

FIG. 2 shows a plan view of the display panel 20 seen from the side of an observer H (FIG. 4) in the Z direction. As an example, the display region DA is formed into a rectangular shape having a length (L2) in the Y direction longer than a length (L1) in the X direction. As an example, the boundary K is set in line with black matrices BM (FIG. 4) located on the outermost side in the X direction and the Y direction among the plurality of black matrices BM described later. As to the boundary K, a part of the boundary K which is closest to the light source section 22 described later and is along the X direction is defined as a boundary K1. Further, another part of the boundary K which is farthest from the light source section 22 and is along the X direction is defined as a boundary K2.

In FIG. 2, in the circuits provided in the display panel 20, some of the plurality of signal wirings (scanning lines GL and signal lines SL) that transmit signals for driving the liquid crystal are indicated by dash-dotted lines. The plurality of scanning lines GL transmit drive signals. The plurality of signal lines SL transmit pixel signals.

The scanning line GL is a wiring containing metal such as molybdenum (Mo) or aluminum (Al), a stacked body thereof, or an alloy thereof. The plurality of scanning lines GL are an example of a plurality of structures and also an example of a plurality of wirings. Each of the plurality of scanning lines GL extends in the X direction. Also, the plurality of scanning lines GL are arranged at a first pitch P1 in the Y direction. The first pitch P1 corresponds to the length from the central position of one scanning line GL in the Y direction to the central position of another scanning line GL in the Y direction adjacent in the Y direction (length L4 as an example). Note that the first pitch P1 includes allowable errors such as an error in the width of the scanning line GL in the manufacture and an error in the arrangement of the respective scanning lines GL in the assembly.

Figure 3:
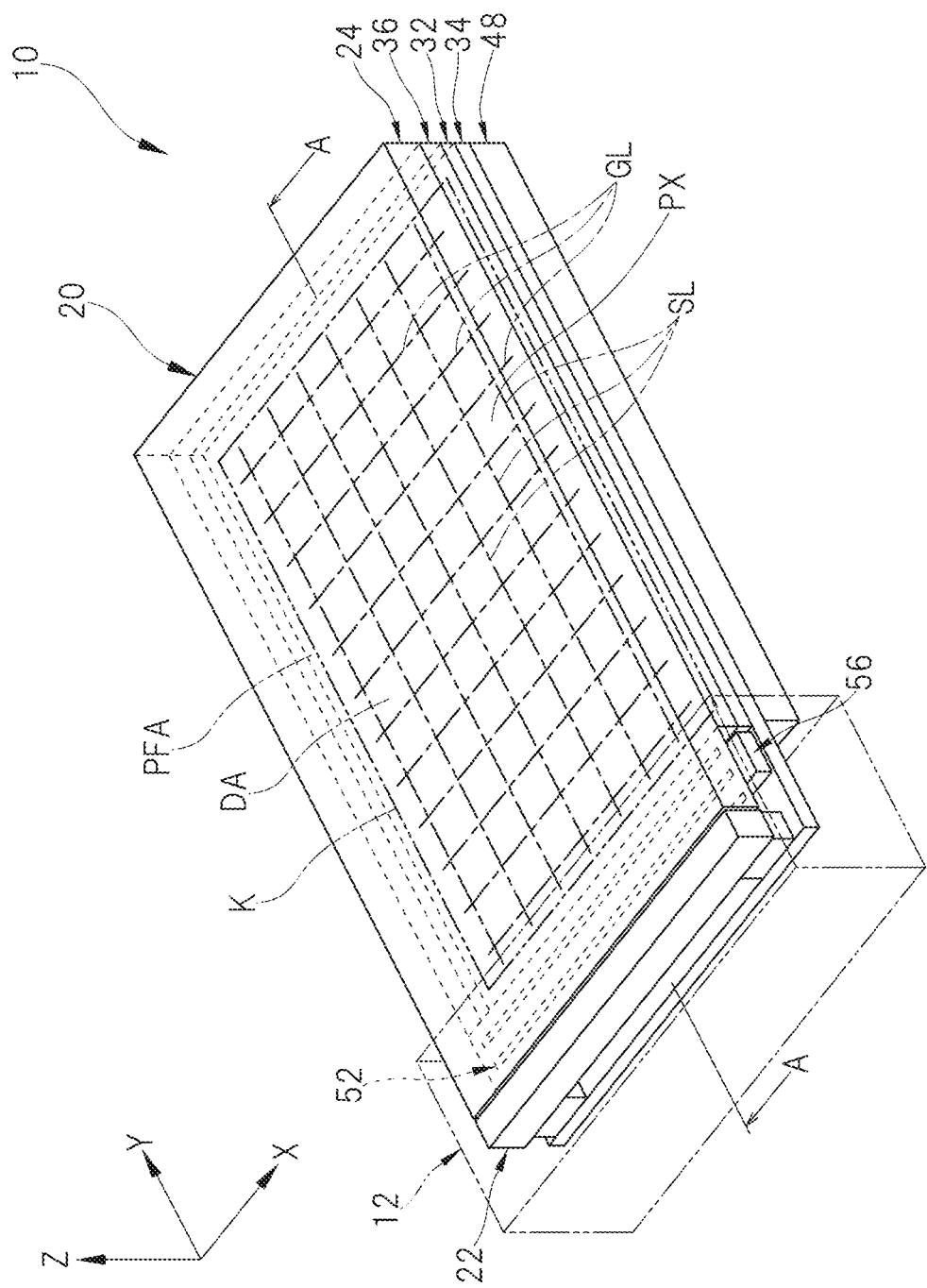
FIG. 3 is a perspective view showing an example of the display panel shown in FIG. 2.

As shown in FIG. 3, the display panel 20 includes, for example, the light source section 22, a glass plate 24, a liquid crystal layer 32, an array substrate 34, a counter substrate 36, a partition section 42 (FIG. 4), a cover glass 48, a diffraction section 52, and a drive circuit 56. When the display unit 10 is configured as a display device, a control circuit, a flexible substrate connected to the display panel 20, a housing, or the like may be included in addition to each part of the display panel 20. In FIG. 3, illustrations of parts other than the display panel 20 are omitted except for the cover section 12.

The shape of the display region DA is, for example, a quadrangular shape when viewed in the Z direction, but it may be a shape other than the quadrangular shape, for example, a polygonal shape or a circular shape. Each of the liquid crystal layer 32, the array substrate 34, the counter substrate 36, and the cover glass 48 overlaps with the display region DA of the glass plate 24 in plan view in the Z direction. For example, the light source section 22 and the drive circuit 56 are mounted on the array substrate 34. As a modification, the light source section 22 and the drive circuit 56 may be attached to a peripheral region PFA of a substrate different from the array substrate 34.

(Light Source Section)

Figure 6:
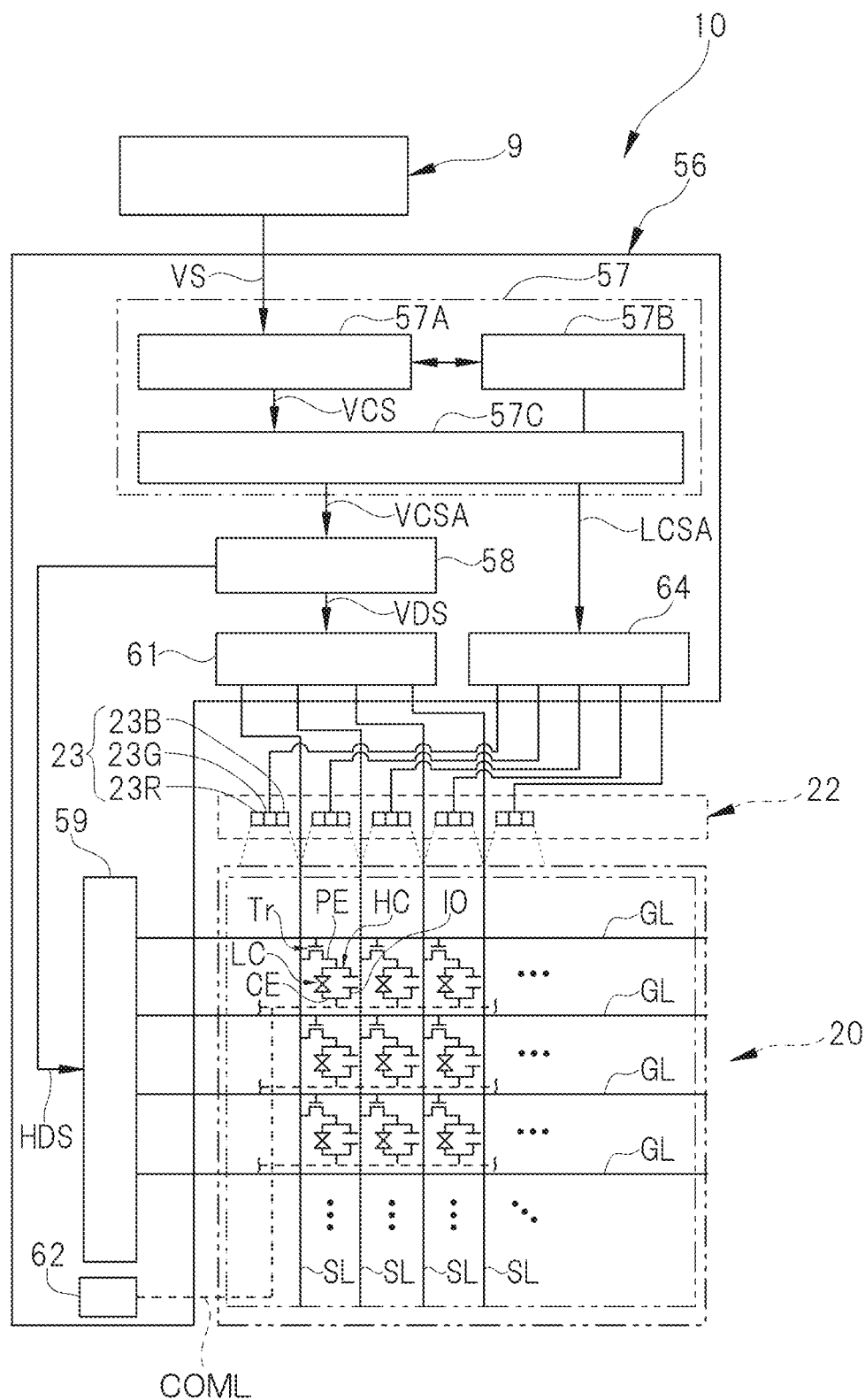
FIG. 6 is a circuit block diagram showing an example of circuits provided in the display panel in FIG. 2.

As shown in FIG. 6, the light source section 22 has a plurality of light emitting sections 23 including light emitting diodes (LEDs). Specifically, the light emitting section 23 includes a first color (for example, red) light emitter 23R, a second color (for example, green) light emitter 23G, and a third color (for example, blue) light emitter 23B. Namely, the light source section 22 is capable of emitting a plurality of lights of different colors. A light source control section 64 controls each of the first color light emitter 23R, the second color light emitter 23G, and the third color light emitter 23B so as to emit lights in a time-division manner (while shifting the time) based on a light source control signal LCSA. In this way, the first color light emitter 23R, the second color light emitter 23G, and the third color light emitter 23B are driven by the field sequential method. Note that the light source section 22 is arranged to face an entrance surface 24C (FIG. 4) described later.

The human eyes have limitation in temporal resolution, which causes persistence of vision. Therefore, when the first color light emitter 23R, the second color light emitter 23G, and the third color light emitter 23B are driven by the field method, composite image of three colors is sequential a recognized in one frame period. Note that, since color filters are not required in the field sequential method, light absorption loss in the color filters is reduced, and thus high transmittance can be achieved.

Figure 7:
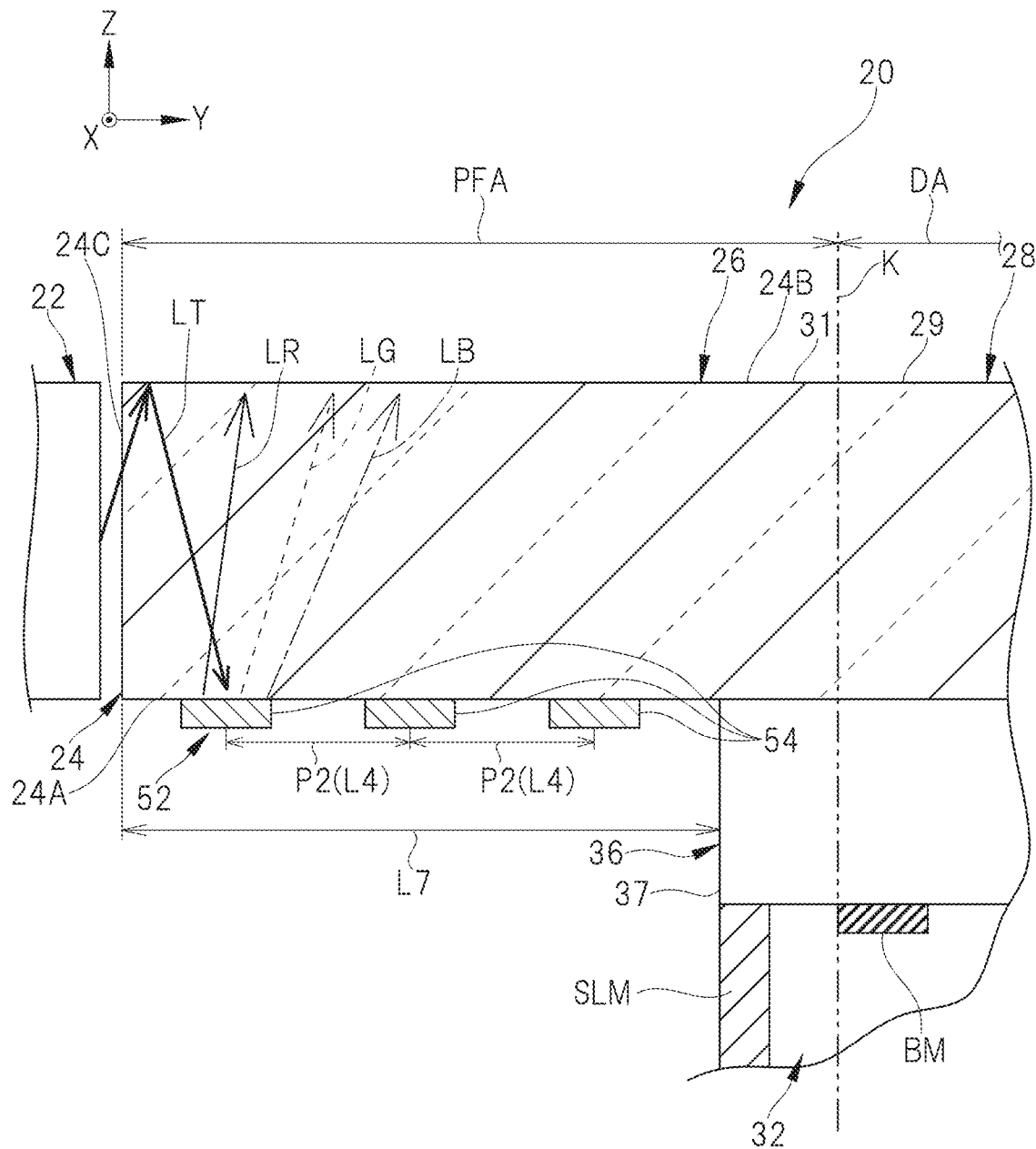
FIG. 7 is a cross-sectional view showing a diffraction section in FIG. 4 in an enlarged manner.

As shown in FIG. 7, the lights emitted from the light source section 22 and emitted in a time-division manner are collectively referred to as the light source light LT. Further, when specifically distinguishing the light source light LT, the light of the first color is referred to as light LR, the light of the second color is referred to as light LG, and the light of the third color is referred to as light LB. The light LR, the light LG, and the light LB are an example of the plurality of lights of different colors.

(Glass Plate)

As shown in FIG. 4, the glass plate 24 is bonded to a front surface 36B of the counter substrate 36 described later. The glass plate 24 is an example of a light guide plate integrally including the light guide section 26 and the display section 28 described later. In other words, the light guide section 26 and the display section 28 are integrally formed. The glass plate 24 extends along the X-Y plane with the Z direction as the thickness direction. When compared in terms of area in the X-Y plane, the glass plate 24 has a smaller area than that of the array substrate 34 and has a larger area than that of the counter substrate 36. The glass plate 24 is located on the side opposite to the liquid crystal layer 32 in the Z direction with respect to the counter substrate 36, and protects the counter substrate 36. Furthermore, the glass plate 24 extends further in the Y direction than the counter substrate 36 toward the light source section 22. The refractive index of the glass plate 24 is about 1.5.

Specifically, the glass plate 24 has a back surface 24A, a front surface 24B, the entrance surface 24C, and an end surface 24D. The back surface 24A faces a front surface 36B described later in the thickness direction. Also, the back surface 24A is an example of a plane extending in the Y direction. The front surface 24B is located on the side opposite to the back surface 24A (side of an observer H) in the Z direction. Namely, the front surface 24B is located on the side of the glass plate 24 opposite to the counter substrate 36. The entrance surface 24C is a surface that faces the light source section 22 in the Y direction, and is a surface through which the light source light LT (FIG. 7) from the light source section 22 enters. Also, the entrance surface 24C is, for example, a plane along the X-Z plane. The end surface 24D is a surface located on the side opposite to the entrance surface 24C in the Y direction.

((Light Guide Section))

The light guide section 26 includes a portion of the glass plate 24 that extends outward in the Y direction than the counter substrate 36 (end surface 37) toward the light source section 22. Specifically, the light guide section 26 is a portion from the entrance surface 24C to the boundary K1. Note that the length from the position of the end surface 37 to the position of the entrance surface 24C in the Y direction is defined as a length L7. Also, the light guide section 26 is a portion which the light source light LT (FIG. 7) emitted from the light source section 22 enters. Further, the light guide section 26 reflects the light source light LT inside the light guide section 26 to cause the light source light LT to travel to the far side in the Y direction and guide it to the counter substrate 36 (including the liquid crystal layer 32).

((Display Section))

The display section 28 is a portion where the image G (FIG. 1) is displayed. Also, the display section 28 is, for example, a portion of the glass plate 24 from the boundary K1 to the end surface 24D. Specifically, the display section 28 has a display surface 29. The display surface 29 is a part of the front surface 24B included in the display section 28. As an example, the image G is displayed on the display surface 29. Note that, since the display surface 29 is exposed outside the cover section 12, it can be visually recognized by the observer H.

When the glass plate 24 is viewed in the Z direction, a part of the front surface 24B located outside the display surface 29 in the Y direction (on the side of the light source section 22) is defined as a non-display surface 31. Since the non-display surface 31 is covered with the cover section 12, it is difficult for the observer H to visually recognize the non-display surface 31.

(Array Substrate)

The array substrate 34 is a transparent substrate that transmits light. The array substrate 34 has a front surface 34A that faces the liquid crystal layer 32 in the Z direction and a back surface 34B on the side opposite to the front surface 34A in the Z direction. The array substrate 34 is a substrate on which a plurality of transistors (transistor elements) as switching elements (active elements) Tr (FIG. 6) are arranged in an array. When compared in terms of area in the X-Y plane, the array substrate 34 is larger than the counter substrate 36. Specifically, the array substrate 34 has an extension portion 34C that extends further toward the light source section 22 than the counter substrate 36 in the Y direction. The extension portion 34C is a portion of the array substrate 34 outside the boundary K1 in the Y direction.

(Counter Substrate)

The counter substrate 36 is a transparent substrate that transmits light. The counter substrate 36 has a back surface 36A that faces the liquid crystal layer 32, a front surface 36B on the side opposite to the back surface 36A in the Z direction, and the end surface 37 on the side of the light source section 22 in the Y direction. Namely, the counter substrate 36 is located on the side opposite to the array substrate 34 with respect to the liquid crystal layer 32. The array substrate 34 and the counter substrate 36 sandwich the liquid crystal layer 32 in the Z direction.

(Liquid Crystal Layer)

The liquid crystal layer 32 including the liquid crystal LQ is located between the front surface 34A and the back surface 36A. The light LR, the light LG, and the light LB (FIG. 7) that have passed through the light guide section 26 can enter the liquid crystal layer 32. Note that "light that has passed through the light guide section 26" is not limited to the light that has passed through only the light guide section 26, but also includes the light that has passed through other members such as the counter substrate 36 from the light guide section 26.

The liquid crystal layer 32 is an optical modulation element. In other words, the display panel 20 has a function of modulating the light passing through the liquid crystal layer 32 by controlling the state of the electric field formed around the liquid crystal layer 32 via the switching elements described above. In this embodiment, modulation of light in the liquid crystal layer 32 means switching between a transparent state and a scattering state. The transparent state and the scattering state will be described later. Note that the display regions DA of the array substrate 34 and the counter substrate 36 respectively overlap with the liquid crystal layer 32 when viewed in the Z direction.

The liquid crystal LQ is a polymer dispersed liquid crystal LC (FIG. 6) and contains a liquid crystalline polymer and liquid crystal molecules. The liquid crystalline polymer is formed into stripes, and the liquid crystal molecules are dispersed in the gaps of the liquid crystalline polymer. Each of the liquid crystalline polymer and the liquid crystal molecules has optical anisotropy or refractive index anisotropy. The responsiveness of the liquid crystalline polymer to the electric field is lower than the responsiveness of the liquid crystal molecules to the electric field. The orientation direction of the liquid crystalline polymer hardly changes regardless of the presence or absence of the electric field.

The orientation direction of the liquid crystal molecules changes depending on the electric field in the state where a high voltage equal to or higher than the threshold is applied to the liquid crystal LQ. When no voltage is applied to the liquid crystal LQ, the optical axes of the liquid crystalline polymer and the liquid crystal molecules are parallel to each other. Therefore, the light source light LT (FIG. 7) that has entered the liquid crystal layer 32 is hardly scattered inside the liquid crystal layer 32 and is transmitted through the liquid crystal layer 32 (transparent state).

On the other hand, in the state where a voltage is applied to the liquid crystal LQ, the optical axes of the liquid crystalline polymer and the liquid crystal molecules intersect with each other. Therefore, the light source light LT that has entered the liquid crystal LQ is scattered inside the liquid crystal layer 32 (scattering state).

In the display panel 20, the transparent state and the scattering state are controlled by controlling the orientation of the liquid crystal LQ in the propagation path of the light source light LT (FIG. 7). In the scattering state, the light source light LT is emitted from the front surface 24B to the outside of the display panel 20 by the liquid crystal LQ (becomes image light). Further, the background light that has entered the counter substrate 36 from the side of the back surface 36A is emitted to the outside from the front surface 24B of the glass plate 24. In other words, the observer H on the side of the front surface 24B can recognize the image light and the background light in combination. The display panel that allows the observer H to recognize the image G and the background 2 (FIG. 1) in a superimposed manner in this way is referred to as a transparent display panel.

The array substrate 34 and the counter substrate 36 are bonded together via a sealing portion (sealing material) SLM. The sealing portion SLM is arranged in the peripheral region PFA so as to surround the display region DA. The liquid crystal layer 32 is located on the inner side of the sealing portion SLM. Namely, the sealing portion SLM functions as a seal that seals the liquid crystal LQ between the array substrate 34 and the counter substrate 36. Further, the sealing portion SLM serves as an adhesive for bonding the array substrate 34 and the counter substrate 36 together.

(Partition Section)

For example, the partition section 42 is provided between the array substrate 34 and the liquid crystal layer 32 and between the counter substrate 36 and the liquid crystal layer 32. Further, the partition section 42 partitions the liquid crystal layer 32 into a plurality of pixel regions PS when viewed in the Z direction. The pixel region PS is the smallest unit region for which individual control with image signals is possible. Each pixel region PS has the length 13 in the X direction and the length L4 in the Y direction. The plurality of pixel regions PS are arranged in a matrix in the X direction and the Y direction. The drive circuit 56 described later operates based on the control signal input from the outside, thereby controlling the display of images in the plurality of pixel regions PS.

Figure 5:
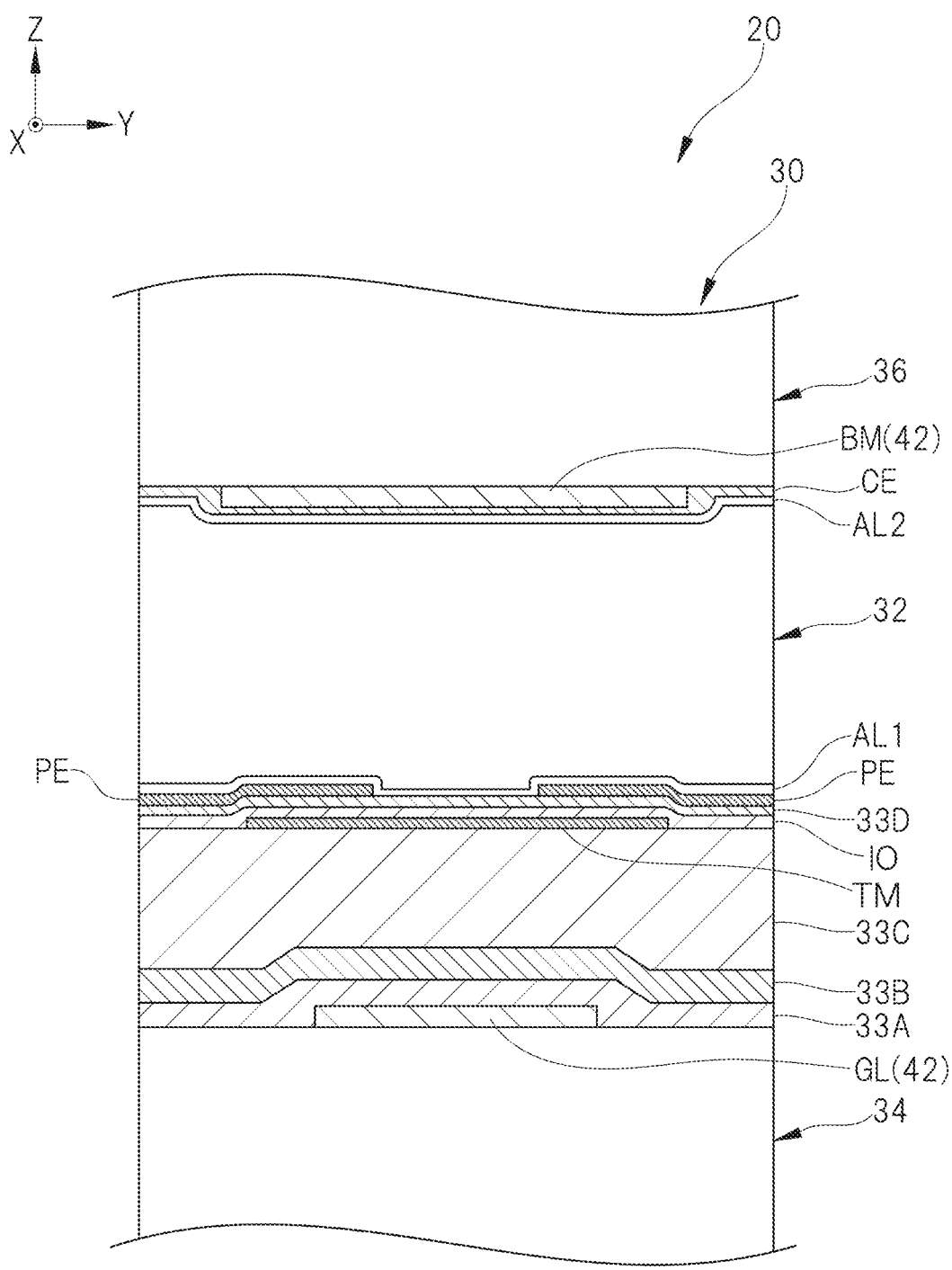
FIG. 5 is a cross-sectional view showing the inside of a region SA in FIG. 4 in an enlarged manner.

FIG. 5 shows an example of a layered structure 30 including the liquid crystal layer 32 and the partition section 42. Note that the layered structure 30 shown in FIG. 5 is the structure inside the region SA in FIG. 4 shown in an enlarged manner. The layered structure 30 includes each layer and each member from the array substrate 34 to the counter substrate 36. The layered structure 30 includes the scanning line GL, a first insulating layer 33A, a second insulating layer 33B, a third insulating layer 33C, a metal layer TM, a holding capacitance electrode IO, a fourth insulating layer 33D, a pixel electrode PE, a first alignment film AL1, the liquid crystal layer 32, a second alignment film AL2, a common electrode CE, and a black matrix BM. The partition section 42 includes, for example, the black matrix BM and the scanning line GL.

The first insulating layer 33A, the second insulating layer 33B, and the fourth insulating layer 33D are formed of, for example, a transparent inorganic insulating material such as silicon nitride. The third insulating layer 33C is made of, for example, a light transmissive organic insulating material such as acrylic resin.

The metal layer TM is, for example, a wiring made of molybdenum, aluminum, or the like. The holding capacitance electrode IO is formed of, for example, a light transmissive conductive material such as indium tin oxide (ITO). The first alignment film AL1 and the second alignment film AL2 are vertical alignment films, and are used to control the orientation of the liquid crystal molecules. The pixel electrode PE and the common electrode CE are used to control the light scattering state of each pixel PX (FIG. 2). For example, when a gradation signal corresponding to the output gradation value of each pixel PX is supplied to the signal line SL (FIG. 2), the voltage applied to the pixel electrode PE changes in accordance with the gradation signal. When the voltage applied to the pixel electrode PE changes, the voltage between the pixel electrode PE and the common electrode CE changes, so that the state of the liquid crystal layer 32 for each pixel PX changes (transparent state, scattering state).

As shown in FIG. 2, the plurality of black matrices BM are formed in a grating shape in the X direction and the Y direction when viewed in the Z direction. The plurality of black matrices BM are another example of the plurality of structures and an example of a plurality of light blocking members that restrict light transmission. The plurality of black matrices BM are arranged at equal intervals in the Y direction. Specifically, the plurality of black matrices BM are arranged at the first pitch P1 in the Y direction. The first pitch P1 corresponds to the length from the central position of one black matrix BM in the Y direction to the central position of another black matrix BM in the Y direction adjacent in the Y direction (length L4 as an example). Note that the first pitch P1 includes allowable errors such as an error in the width of the black matrix BM in the manufacture and an error in the arrangement of the respective black matrices BM in the assembly.

Also, the black matrix BM is made of a conductive metal material. Examples of metal materials contained in the black matrix BM include aluminum (Al), copper (Cu), silver (Ag), molybdenum (Mo), chromium (Cr), titanium (Ti), tungsten (W), and others. Among the side surfaces of the plurality of black matrices BM, the side surface located closest to the light source section 22 when viewed in the X direction is defined as an end surface BML (FIG. 4). The end surface BML extends in the Z direction. Further, the position of the end surface BML in the Y direction corresponds to the position of the boundary K1. The plurality of black matrices BM face the plurality of scanning lines GL in the Z direction.

(Drive Circuit)

As shown in FIG. 6, the drive circuit 56 includes, for example, a signal processing circuit 57, a pixel control circuit 58, a gate drive circuit 59, a source drive circuit 61, and a common potential drive circuit 62. The drive circuit 56 is provided in the extension portion 34C (FIG. 4).

As an example, a first input signal (RGB signal or the like) VS is input to the signal processing circuit 57 from an external control section 9 for the display panel 20. The signal processing circuit 57 includes an input signal analysis section 57A, a storage section 57B, and a signal adjustment section 57C. The input signal analysis section 57A generates a second input signal VCS based on the input first input signal VS. The second input signal VCS is a signal that determines what gradation value is given to each pixel PX (FIG. 2) of the display panel 20 based on the first input signal VS. In other words, the second input signal VCS is a signal including gradation information regarding the gradation value of each pixel PX.

The signal adjustment section 57C generates a third input signal VCSA from the second input signal VCS. Also, the signal adjustment section 57C sends the third input signal VCSA to the pixel control circuit 58, and sends the light source control signal LCSA to the light source control section 64. The light source control signal LCSA is, for example, a signal that includes information of the amount of light from the light emitting section 23, which is set in accordance with the gradation value input to the pixel PX. The light emitting section 23 is included in the light source section 22.

The pixel control circuit 58 generates a horizontal drive signal HDS and a vertical drive signal VDS based on the third input signal VCSA. In this embodiment, the driving by the field sequential method is performed. Therefore, the horizontal drive signal HDS and the vertical drive signal VDS are generated for each color that the light emitting section 23 can emit.

The gate drive circuit 59 sequentially selects the scanning lines GL of the display panel 20 in the vertical scanning period based on the horizontal drive signal HDS. The order of selection of the scanning lines GL is not particularly limited. The source drive circuit 61 supplies a gradation signal corresponding to the output gradation value of each pixel PX to each signal line SL of the display panel 20 in the horizontal scanning period based on the vertical drive signal VDS.

The display panel 20 is an active matrix panel. The display panel 20 includes signal (source) lines SL extending in the Y direction and scanning (gate) lines GL extending in the X direction in plan view. The switching element Tr is provided at the intersection of the signal line SL and the scanning line GL. A thin film transistor is used as the switching element Tr.

One of the source and drain electrodes of the switching element Tr is connected to the signal line SL, the gate electrode is connected to the scanning line GL, and the other of the source and drain electrodes is connected to one end of the capacitance of the polymer dispersed liquid crystal LC. One end of the polymer dispersed liquid crystal LC is connected to the switching element Tr via the pixel electrode PE, and the other end is connected to a common potential wiring COML via the common electrode CE. Also, a holding capacitance HC is generated between the pixel electrode PE and the holding capacitance electrode IO electrically connected to the common potential wiring COML. Note that power is supplied from the common potential drive circuit 62 to the common potential wiring COML.

(Cover Glass)

As shown in FIG. 4, the cover glass 48 is bonded to the back surface 34B of the array substrate 34. The cover glass 48 is a glass that protects the array substrate 34. Note that the cover glass 48 may be a transparent member made of resin such as acrylic.

(Diffraction Section)

As shown in FIG. 7, the diffraction section 52 is fixed to the light guide section 26. Specifically, the diffraction section 52 is bonded to a portion of back surface 24A corresponding to the light guide section 26. The diffraction section 52 is configured to diffract the light source light LT (light LR, LG, LB) that has entered the light guide section 26 from the light source section 22. In other words, the diffraction section 52 performs the first-order diffraction of the light source light LT before entering the light crystal layer 32. The diffraction section 52 includes a plurality of diffraction plates 54. In FIG. 7, three diffraction plates 54 are illustrated as an example. Note that the number of diffraction plates 54 is not limited to three, and one, two, four or more diffraction plates 54 may be provided.

As shown in FIG. 2 and FIG. 7, the diffraction plate 54 is formed into a rectangular shape having a length (L5) in the X direction longer than a length (L6) in the Y direction. Also, the diffraction plate 54 has a rectangular cross section in which the length in the Y direction is longer than the length in the Z direction when viewed in the X direction. As an example, the plurality of diffraction plates 54 extend in the X direction and are arranged at a second pitch P2 in the Y direction. The second pitch P2 corresponds to the length from the central position of one diffraction plate 54 in the Y direction to the central position of another diffraction plate 54 in the Y direction adjacent in the Y direction. Further, the second pitch P2 has, for example, the length L4 that is equal to the first pitch P1 (FIG. 2). Note that the case where the first pitch P1 and the second pitch P2 are equal is not limited to the case where the respective lengths are the same, but also includes the case where the respective lengths are different within an allowable error range.

Operation of First Embodiment

Figure 8:
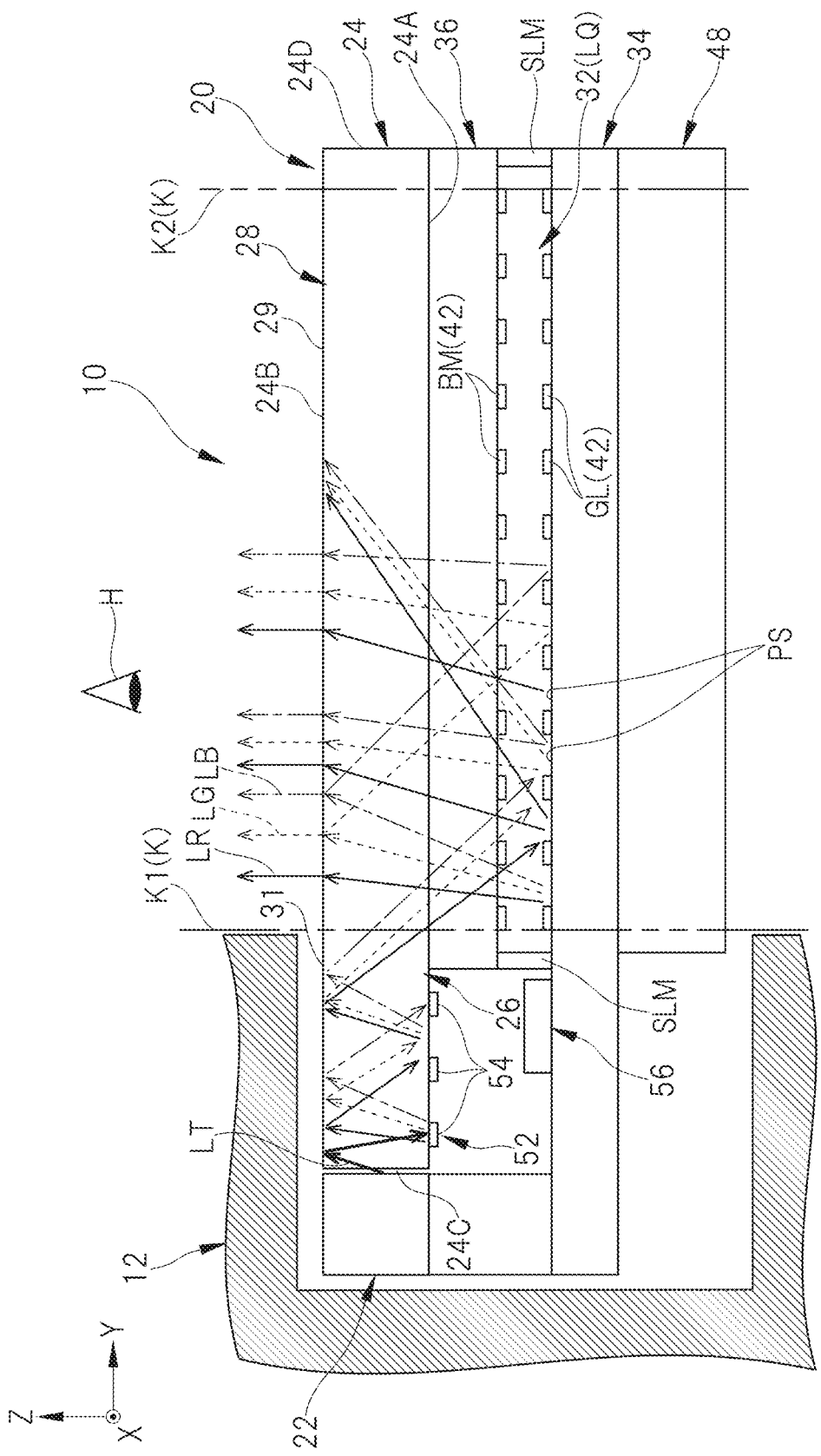
FIG. 8 is an explanatory diagram schematically showing a path of light emitted from a light source section of the display panel in FIG. 2.

The optical path of the light source light LT emitted from the light source section 22 in the display panel 20 will be described with reference to FIG. 8. In FIG. 8, hatching of some members is removed in order to clearly show each configuration and light. Note that the light source light LT is indicated by thick solid line arrows, the light LR is indicated by thin solid line arrows, the light LG is indicated by dashed line arrows, and the light LB is indicated by dash-dotted line arrows for distinction.

The light source light LT emitted from the light source section 22 enters the light guide section 26 (glass plate 24) from the entrance surface 24C. The light source light LT that has entered the glass plate 24 propagates in a direction away from the entrance surface 24C while being reflected by the back surface 24A and the front surface 24B. Specifically, the back surface 24A and the front surface 24B are interfaces between a medium with a high refractive index (glass) and a medium with a low refractive index (air). Therefore, if the incident angle at which the light source light LT is incident on the back surface 24A and the front surface 24B is larger than the critical angle, the light source light LT is totally reflected on the back surface 24A and the front surface 24B. Note that a part of the light source light LT enters the liquid crystal layer 32 through the counter substrate 36.

Here, the diffraction section 52 is provided on the back surface 24A of the light guide section 26. Therefore, when the light source light LT reaches the diffraction section 52, the reflection-type diffraction of the light source light LT is performed by the plurality of diffraction plates 54 of the diffraction section 52. In other words, the light source light LT is subjected to the first-order diffraction in the diffraction section 52. A part of the light source light LT (light LR, light LG, light LB) that has been subjected to the first-order diffraction enters the liquid crystal layer 32 from the light guide section 26 or the display section 28 through the counter substrate 36. Note that, since the cover section 12 exists, the observer H does not visually recognize the light source light LT.

As shown in FIG. 1, FIG. 2, FIG. 5, and FIG. 8, in the pixel PX of the liquid crystal layer 32, the voltage applied to the pixel electrode PE changes in accordance with the signal. When the voltage applied to the pixel electrode PE changes, the voltage between the pixel electrode PE and the common electrode CE changes. Then, the scattering state of the liquid crystal layer 32 for each pixel PX is controlled in accordance with the voltage applied to the pixel electrode PE. In other words, the scattering rate of light in the pixel PX changes. In the pixel PX corresponding to the image G, the light LR, the light LG, and the light LB are scattered. In this way, the image G is displayed on the display section 28. The observer H can visually recognize the displayed image G together with the background 2.

As shown in FIG. 8, the partition section 42 (the plurality of scanning lines GL and the plurality of black matrices BM) may become a diffraction grating that diffracts the light LR, the light LG, and the light LB. In other words, the light LR, the light LG, and the light LB emitted from the display surface 29 may contain diffracted light. Here, as described above, the first-order diffraction of the light source light LT has already been performed in the diffraction section 52. Therefore, the light LR, the light LG, and the light LB emitted from the display surface 29 are N-order diffracted light which is second or higher order diffracted light.

The N-order diffracted light which is second or higher order diffracted light visually recognized by the observer H has a higher possibility of color mixture as compared with the above-mentioned first-order diffracted light. Therefore, the color unevenness (gradation-like rainbow unevenness in which each of red, green, and blue rays is noticeable individually) when the observer H visually recognizes the first-order diffracted light is less likely to be visually recognized. In particular, inside the light entrance region DB (FIG. 1) where light with a lower order of diffraction is emitted, the possibility that the observer H visually recognizes the color unevenness is reduced. In this way, the performance of the display panel 20 can be improved.

In the display panel 20, the plurality of scanning lines GL, which are a part of the partition section 42, are arranged at the first pitch P1 in the Y direction. Further, the plurality of diffraction plates 54 are arranged at the second pitch equal to the first pitch P1 in the Y direction. Therefore, the state of light diffraction performed by the diffraction section 52 and the state of light diffraction performed by the partition section 42 can be brought close to a similar state. In other words, the possibility that color unevenness occurs in the image G displayed on the display surface 29 can be reduced as compared with the case where the state of light diffraction differs between the diffraction section 52 and the partition section 42.

In the display panel 20, the plurality of black matrices BM, which are another part of the partition section 42, are arranged at the first pitch P1 in the Y direction. Also, the plurality of black matrices BM face the plurality of scanning lines GL in the Z direction. Therefore, the state of light diffraction performed by the plurality of scanning lines GL and the state of light diffraction performed by the plurality of black matrices BM can be brought close to a similar state.

Configuration of Second Embodiment

Figure 9:
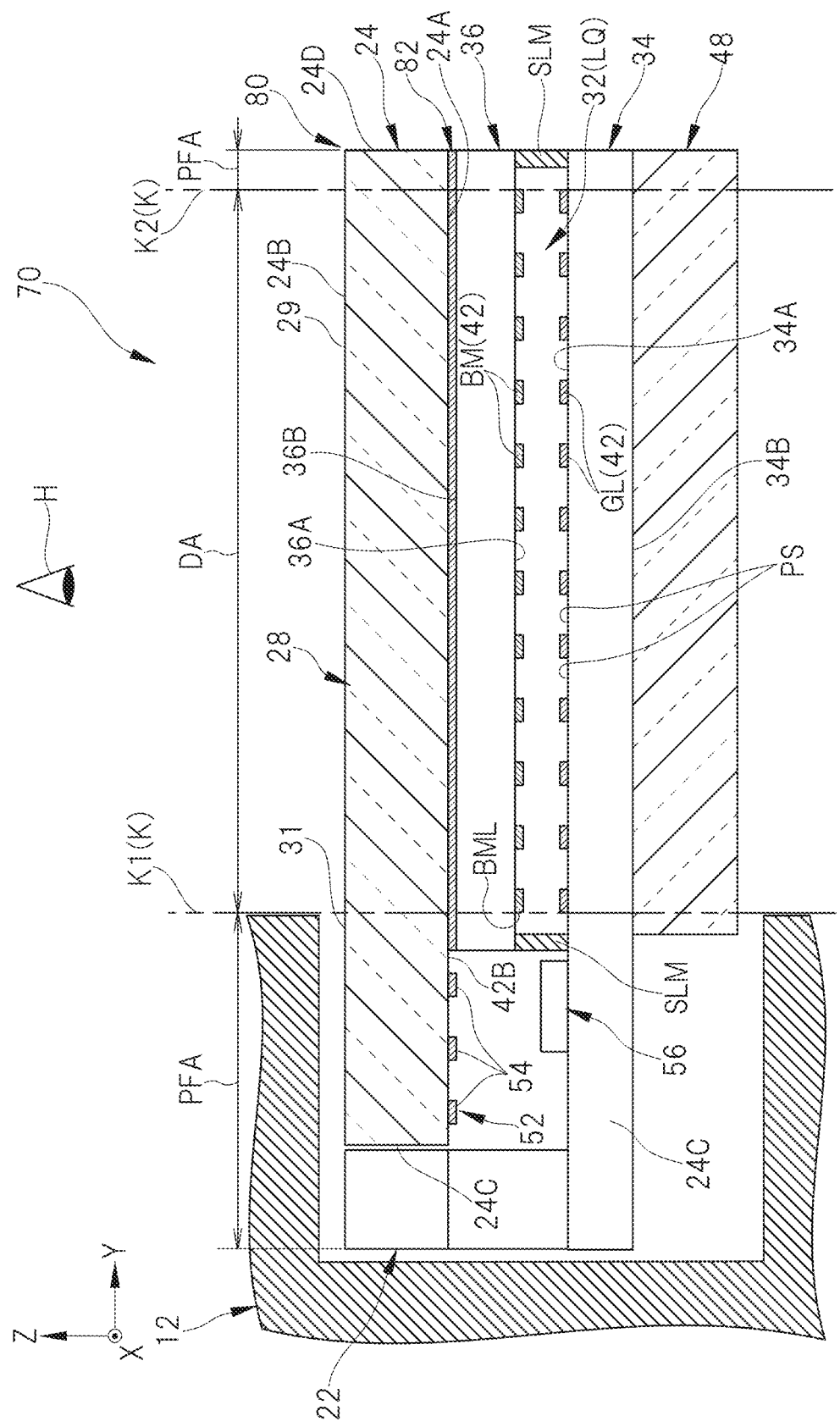
FIG. 9 is a cross-sectional view showing a display unit according to the second embodiment.

FIG. 9 shows a display unit 70 according to the second embodiment. Note that, in the following description, the components that have been described in the first embodiment are denoted by the same reference characters as those in the first embodiment, and the repetitive description thereof will be omitted in some cases.

The display unit 70 includes the cover section 12 and a display panel 80. The cover section 12 is configured to cover portions of the display panel 80 except the display section 28. Note that the display unit 70 and the display panel 80 are each an example of a display device. The display panel 80 differs from the display panel 20 in that a transparent layer 82 is added to the display panel 20 (FIG. 4). The configuration other than the transparent layer 82 is the same as that of the display panel 20, and thus the description thereof will be omitted.

(Transparent Layer)

Figure 10:
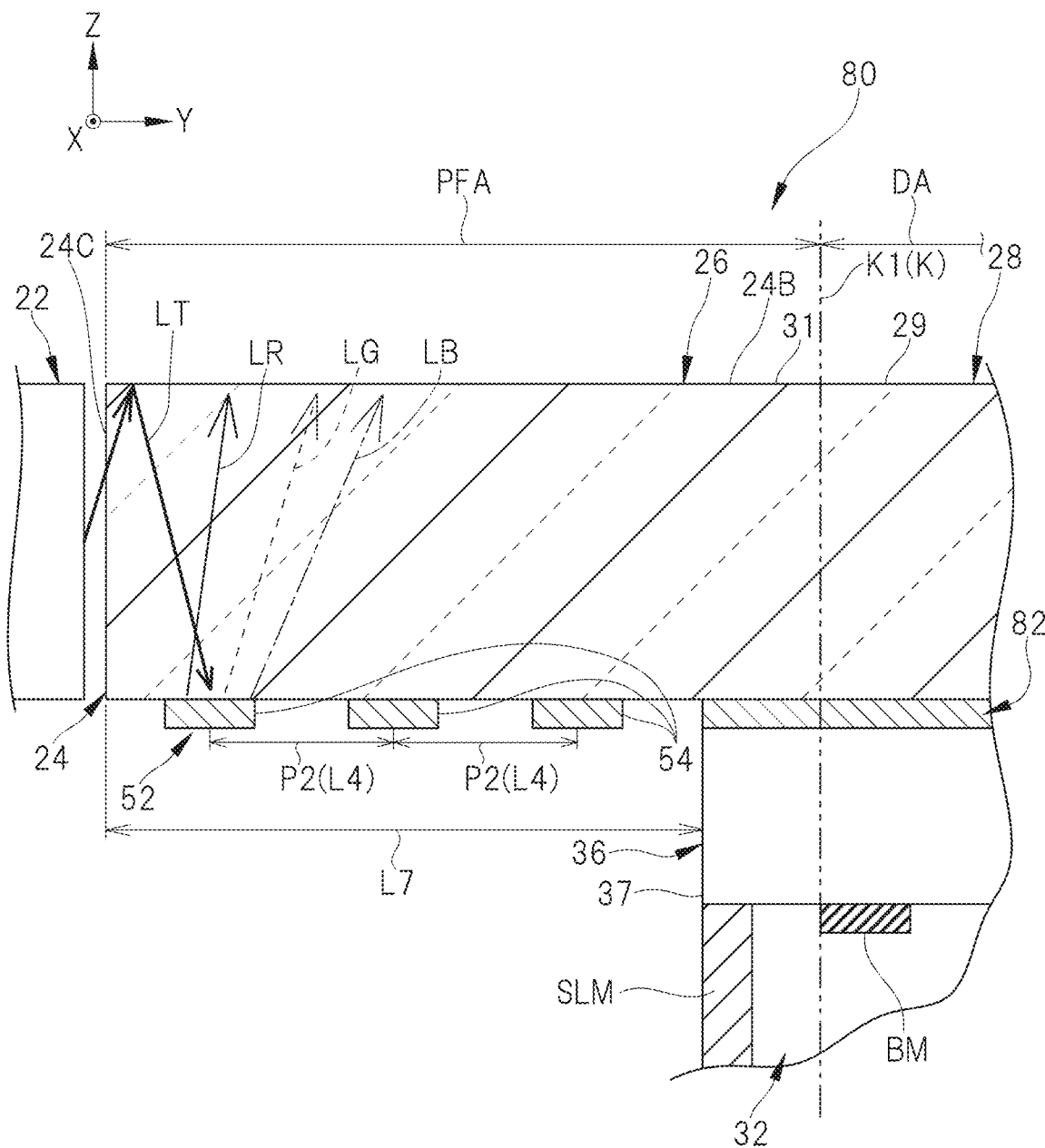
FIG. 10 is a cross-sectional view showing a diffraction section in FIG. 9 in an enlarged manner.

As shown in FIG. 9 and FIG. 10, the transparent layer 82 is an example of a transparent section, and is provided between the display section 28 and the liquid crystal layer 32. Specifically, the transparent layer 82 is formed into a plate shape whose thickness direction corresponds to the Z direction. The transparent layer 82 is made of, for example, an organic material such as a siloxane resin or a fluororesin. The transparent layer 82 is in close contact with the back surface 24A and the front surface 36B. Note that "close contact" is not limited to the state in which the transparent layer 82 is in direct contact with the back surface 24A and the front surface 36B, but includes the state in which an adhesive layer is interposed between the transparent layer 82 and the back surface 24A and the front surface 36B.

The transparent layer 82 has a refractive index smaller than that of the glass plate 24. Namely, the transparent layer 82 has a refractive index lower than that of the display section 28. The refractive index of the transparent layer is set between 1.0 and 1.4. In this embodiment, a part of the transparent layer 82 extends to a part of the light guide section 26 as an example.

The diffraction section 52 and the transparent layer 82 are arranged in the Y direction. Further, the diffraction section 52 and the transparent layer 82 are provided on the back surface 24A. The refractive index of the plurality of diffraction plates 54 of the diffraction section 52 is, for example, equal to the refractive index of the transparent layer 82. Note that "the refractive indexes are equal" is not limited to the case where the refractive index values are the same, but includes the case where the refractive index values are different within an allowable range of measurement error. When the diffraction section 52 and the transparent layer 82 are made of the same material and are formed to have the same thickness, it is possible to form the diffraction section 52 and the transparent layer 82 on the back surface 24A at a time.

Figure 11:
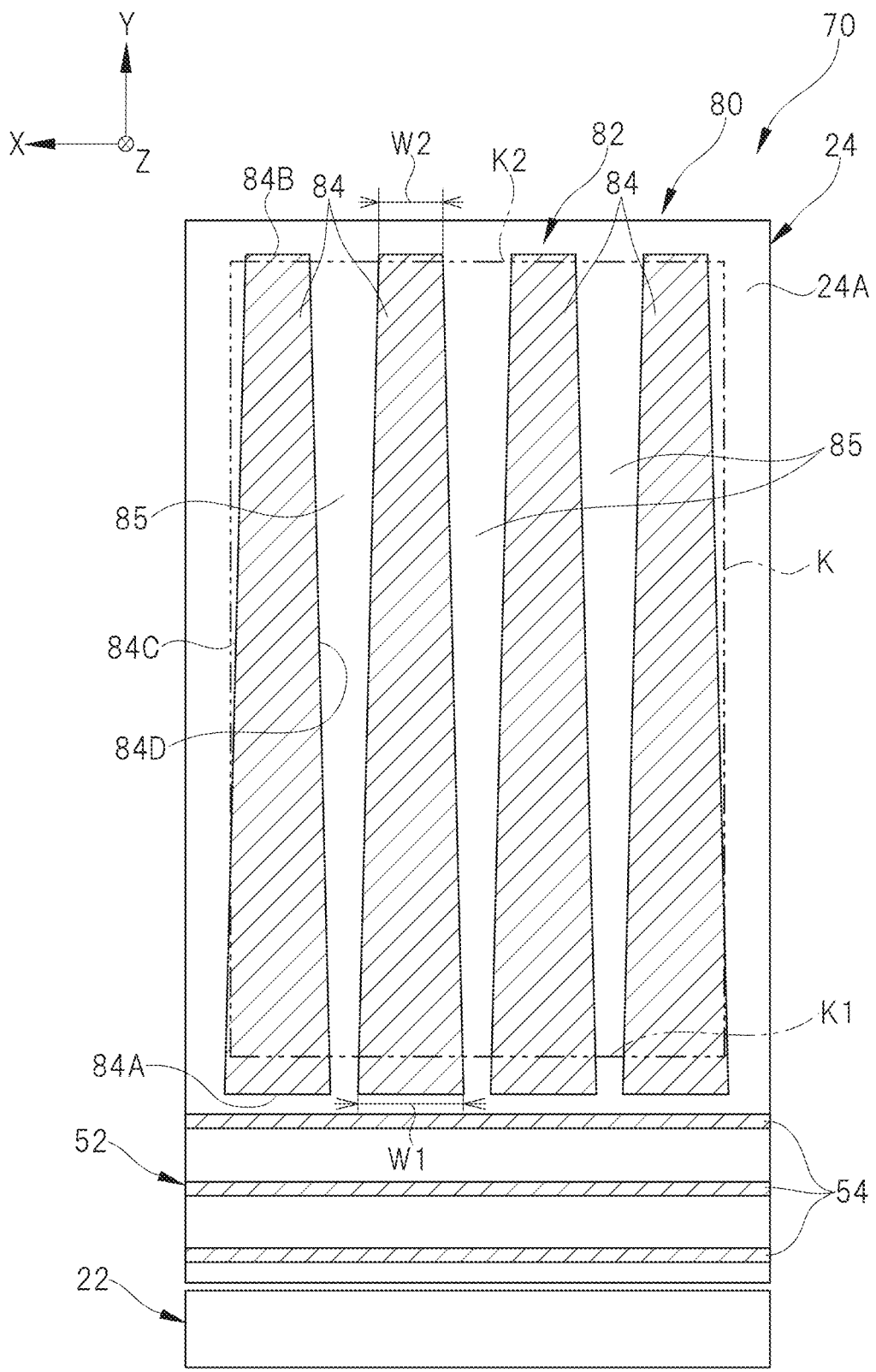
FIG. 11 is a bottom view showing a diffraction section and a transparent layer in FIG. 9 seen from a back surface side of a glass plate.

As shown in FIG. 11, the transparent layer 82 includes a plurality of band portions 84 arranged at intervals in the X direction. Each band portion 84 extends in the Y direction. The band portion 84 is formed into a trapezoidal shape having the lower base thereof located on the side of the light source section 22 and the upper base thereof located on the side opposite to the light source section 22 when viewed in the Z direction. The band portion 84 has a first end surface 84A corresponding to the lower base of the trapezoid, a second end surface 84B corresponding to the upper base of the trapezoid, and side surfaces 84C and 84D corresponding to the oblique sides of the trapezoid. The first end surface 84A has a first width W1 that is the width in the X direction. The second end surface 84B has a second width W2 that is the width in the X direction. The first width W1 is larger than the second width W2. Thus, the width of the band portion 84 in the X direction becomes narrower as it gets away from the light source portion 22 in the Y direction. In other words, the distance between adjacent band portions 84 in the X direction increases as it gets away from the light source section 22 in the Y direction.

Operation of Second Embodiment

Figure 12:
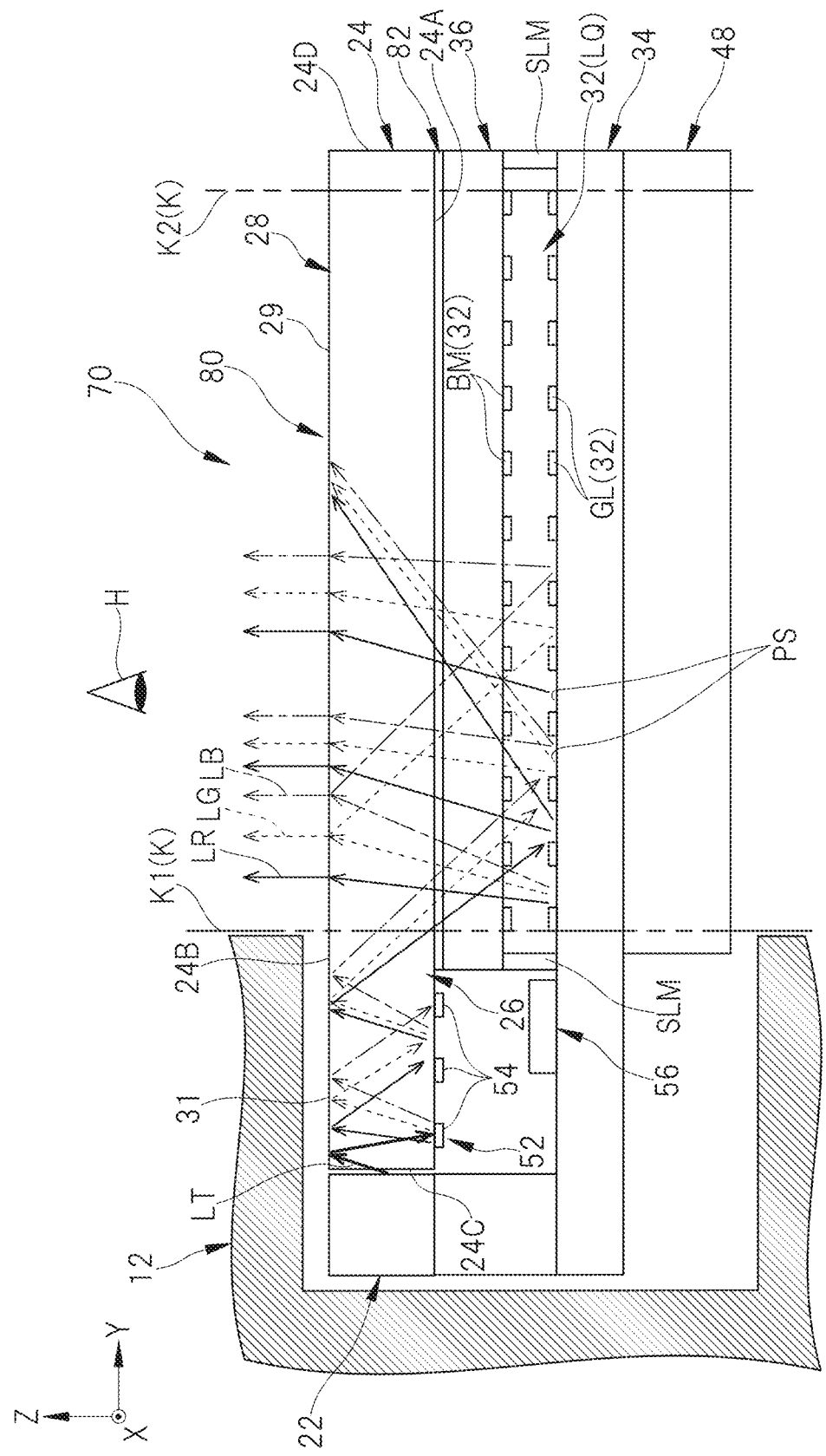
FIG. 12 is an explanatory diagram schematically showing a path of light emitted from a light source section of a display panel in FIG. 9.

The optical path of the light source light LT emitted from the light source section 22 in the display panel 80 will be described with reference to FIG. 12. In FIG. 12, hatching of some members is removed in order to clearly show each configuration and light. Note that descriptions of the same configuration and similar operation as those in the first embodiment will be omitted.

The light source light LT emitted from the light source section 22 enters the glass plate 24 (light guide section 26). Then, the light source light LT propagating in the light guide section 26 is subjected to the first-order diffraction by the plurality of diffraction plates 54 of the diffraction section 52. The light source light LT that has been subjected to the first-order diffraction enters the liquid crystal layer 32 from the glass plate 24 through the counter substrate 36. In the liquid crystal layer 32, as described above, the light source light LT is scattered by the pixel PX (FIG. 2) of the display target. In this way, the observer H can visually recognize the image G (FIG. 1) together with the background 2. Here, in the diffraction section 52, the first-order diffraction of the light source light LT has already been performed. Accordingly, there is a high possibility that the light LR, the light LG, and the light LB emitted from the display surface 29 are N-order diffracted light which is second or higher order diffracted light. Therefore, it becomes difficult for the observer H to visually recognize the color unevenness. In this way, the performance of the display panel 80 can be improved.

A plurality of components of the layered structure 30 (FIG. 5) exist in the display panel 80. Therefore, there is a possibility that the light source light LT is attenuated (decreases in brightness) due to absorption or scattering as the light source light LT travels to a region away from the light source section 22. Here, a large amount of the transparent layer 82 exists in a portion of the display panel 80 on the side closer to the light source section 22. Therefore, the light source light LT is less likely to enter the liquid crystal layer 32 in the portion of the display panel 80 on the side closer to the light source section 22. In other words, the light source light LT is likely to travel toward the far side in the Y direction. On the other hand, a large amount of air layer 85 exists in a portion of the display panel 80 on the side far from the light source section 22. Therefore, the light source light LT is likely to enter the liquid crystal layer 32.

In this way, in the display panel 80, the entrance of the light source light LT into the liquid crystal layer 32 is ensured on the far side in the Y direction where there is a high possibility of the decrease in brightness. Furthermore, the entrance of the light source light LT into the liquid crystal layer 32 is suppressed on the near side in the Y direction where there is a low possibility of the decrease in brightness. As a result, in the display panel 80, the difference between the brightness of the image light on the far side in the Y direction and the brightness of the image light on the near side in the Y direction can be reduced.

In the display panel 80, the diffraction section 52 and the transparent layer 82 are arranged in the Y direction. In other words, the position of the diffraction section 52 in the Z direction and the position of the transparent layer 82 in the Z direction are aligned. Therefore, it is possible to suppress the increase in size of the display panel 80 in the Z direction as compared with the configuration in which the diffraction section 52 and the transparent layer 82 are not arranged in the Y direction.

In the display panel 80, the light guide section 26 and the display section 28 are integrally formed as the glass plate 24. Therefore, it is possible to suppress the position of the display section 28 in the Y direction from shifting with respect to the position of the light guide section 26 in the Y direction as compared with the configuration in which the light guide section 26 and the display section 28 are separately formed.

In the display panel 80, the refractive index of the diffraction section 52 is equal to the refractive index of the transparent layer 82. Therefore, since the same material can be used for the diffraction section 52 and the transparent layer 82, the diffraction section 52 and the transparent layer 82 can be formed in one process.

Modification

The present invention is not limited to the first and second embodiments described above. Modifications will be described below.

In the display panel 20, the first pitch P1 of the partition section 42 and the second pitch P2 of the diffraction plate 54 may have different values. Namely, the pitches of the partition section 42 and the diffraction section 52 may be different as long as the light source light LT (light LR, light LG, light LB) is subjected to the first-order diffraction in the light guide section 26 before being diffracted in the partition section 42. The pitch of the scanning lines GL in the Y direction and the pitch of the black matrices BM in the Y direction may have partially different values.

In the display panel 80, the diffraction section 52 and the transparent layer 82 do not have to be arranged in the Y direction. The light guide section 26 and the display section 28 may be provided separately. The refractive index of the diffraction section 52 and the refractive index of the transparent layer 82 may be different from each other. The diffraction section 52 and the transparent layer 82 do not have to be in close contact with the back surface 24A.

Although the respective embodiments and modifications have been described above, the above-described technique can be applied to various modifications other than those illustrated above.

A person having ordinary skill in the art can make various alterations and corrections within a range of the idea of the present invention, and it is interpreted that the alterations and corrections also belong to the scope of the present invention. For example, the embodiments obtained by performing addition or elimination of components or design change or the embodiments obtained by performing addition or reduction of process or condition change to the embodiments described above by a person having an ordinary skill in the art are also included in the scope of the present invention as long as they include the gist of the present invention.

The present invention can be applied to display devices and electronic devices incorporating display devices.

What is claimed is:

1. A display device comprising:
   a light source section capable of emitting a plurality of lights of different colors;
   a light guide section which the light emitted from the light source section enters;
   a liquid crystal layer which the light that has passed through the light guide section enters;

a partition section configured to partition the liquid crystal layer into a plurality of pixel regions and including a plurality of structures arranged at intervals in an intersecting direction that intersects with a thickness direction of the light guide section;

a display section on which an image formed by light emitted from the plurality of pixel regions is displayed; and a diffraction section configured to diffract the plurality of lights that have entered the light guide section from the light source section, wherein a transparent section having a refractive index lower than a refractive index of the display section is provided between the display section and the liquid crystal layer, wherein the diffraction section and the transparent section are arranged in the intersecting direction, wherein the light guide section and the display section are integrally formed, and wherein a refractive index of the diffraction section is equal to the refractive index of the transparent section.

2. A display device comprising:

a light source section capable of emitting a plurality of lights of different colors;

a light guide section which the light emitted from the light source section enters;

a liquid crystal layer which the light that has passed through the light guide section enters;

a partition section configured to partition the liquid crystal layer into a plurality of pixel regions and including a plurality of structures arranged at intervals in an intersecting direction that intersects with a thickness direction of the light guide section;

a display section on which an image formed by light emitted from the plurality of pixel regions is displayed; and a diffraction section configured to diffract the plurality of lights that have entered the light guide section from the light source section, wherein the plurality of structures are a plurality of wirings arranged at a first pitch in the intersecting direction, and wherein the diffraction section includes a plurality of diffraction plates arranged at a second pitch equal to the first pitch in the intersecting direction and extending in a width direction that intersects with each of the thickness direction and the intersecting direction.

3. The display device according to claim 1, wherein the plurality of structures are a plurality of wirings arranged at a first pitch in the intersecting direction, and wherein the diffraction section includes a plurality of diffraction plates arranged at a second pitch equal to the first pitch in the intersecting direction and extending in a width direction that intersects with each of the thickness direction and the intersecting direction.

4. The display device according to claim 2, wherein the plurality of structures include a plurality of light blocking members arranged at the first pitch in the intersecting direction, and wherein the plurality of light blocking members face the plurality of wirings in the thickness direction.

5. The display device according to claim 2, wherein a transparent section having a refractive index lower than a refractive index of the display section is provided between the display section and the liquid crystal layer, and wherein the diffraction section and the transparent section are arranged in the intersecting direction.

6. The display device according to claim 5, wherein the light guide section and the display section are integrally formed.

* * * * *